United States Patent [19]

Hoffman et al.

[11] 4,173,429
[45] Nov. 6, 1979

[54] CENTRIFUGAL FAN, SHAFT, PLATE AND HUB ASSEMBLY

[75] Inventors: Joseph H. Hoffman, Norwood, Mass.; Daniel G. Thompson, Plum Borough, Pa.

[73] Assignee: Westinghouse Electric Corp., Pittsburgh, Pa.

[21] Appl. No.: 857,483

[22] Filed: Dec. 5, 1977

[51] Int. Cl.² .............................................. F04D 17/08
[52] U.S. Cl. ............................... 416/184; 416/214 A; 416/244 R
[58] Field of Search ............... 416/241 B, 244 R, 184, 416/199, 214, 208

[56] References Cited

U.S. PATENT DOCUMENTS

| 116,414 | 6/1871 | Cochrane | 416/214 A |
|---|---|---|---|
| 1,345,951 | 7/1920 | Phelps | 416/184 |
| 1,999,326 | 4/1935 | Forsyth | 416/214 R |
| 2,473,814 | 6/1949 | Nygren | 416/186 |
| 2,981,517 | 4/1961 | Georges | 416/214 A |
| 3,602,609 | 8/1971 | Hoffman | 416/184 |
| 3,832,091 | 8/1974 | Hoffman | 416/184 |

FOREIGN PATENT DOCUMENTS

| 712910 | 10/1941 | Fed. Rep. of Germany | 416/199 |
|---|---|---|---|
| 879755 | 3/1943 | France | 416/241 B |
| 305473 | 3/1930 | United Kingdom | 416/214 R |
| 332859 | 7/1930 | United Kingdom | 416/184 |

*Primary Examiner*—Everette A. Powell, Jr.
*Attorney, Agent, or Firm*—E. C. Arenz

[57] ABSTRACT

A hub assembly for a centrifugal fan subjected to large transient thermal stresses is provided in which a pair of opposed hubs sandwich the inner peripheral margin of a disc-shaped fan plate, with the inner peripheral margin of the plate including a thickened ring portion to provide oppositely projecting annular shoulders at the outer periphery of the thickened ring portion, with the opposing hubs having annular recesses to receive the thickened ring portion and with the outer peripheries of the recesses in closely abutting relation with the shoulders to provide a shoulder-recess bearing area and with a plurality of fastener means extending through the hubs and through the thickened ring portion so that the shoulder-recess bearing area, which is located radially outwardly from the bearing stress areas at the bolt holes, largely receives the transient thermal stresses and therefore reduces the stress in the bolts and plate.

10 Claims, 4 Drawing Figures

CENTRIFUGAL FAN, SHAFT, PLATE AND HUB ASSEMBLY

BACKGROUND OF THE INVENTION

1. Field of the Invention

The invention pertains to the art of shaft, plate and hub assemblies for hot gas fans such as those used for induced draft and gas recirculation duty.

2. Fan Design Considerations and Description of the Prior Art

Before discussing two prior art patents which may superficially seem to be quite pertinent to this invention, some design considerations in connection with centrifugal fans which operate in high temperature environments are believed worthy of discussion. A fan plate operating in a hot gas environment, such as at 750° F. (399° C.), and where the operating temperature has been reached from normal ambient temperature in a period of about 30 minutes, has a temperature gradient from the outer periphery of the plate to the inner periphery of the plate which ranges from about 590° F. (310° C.) at the outer edge to about 200° F. (93° C.) at the inner periphery adjacent the shaft. This condition occurs with a fan construction in which the plate is attached to the shaft by a pair of opposing hub members, one of which is integral with the shaft and the other is in the form of a ring. As a result, the stresses in the plate successively increase from the radially outer parts of the plate toward the location of connection of the plate to the hub. This condition of the stresses imposed upon the plate by the thermal transient may be visualized as being analogous to a simple disc which has its radially outer portion subjected to heat, while the radially inner portion is not heated or is subjected to cold. The outer portion under these conditions will grow and be in strain while the radially inner portion of the disc will not correspondingly grow so that large stresses are set up between the radially outer portion and the radially inner portion of the disc. It is such stress to which the bolts and the centerplate and hub material is subjected, along with the centrifugal force stress of course.

Taking care of stresses imposed upon the bolts poses no great problem since high quality bolt material is available, and is relatively inexpensive in the sense that not much bolt material is required. However, it will be apparent that using equally high quality material for the fan plate, which is of course many, many times larger, is not practical. Accordingly, it would be desirable to provide a shaft, hub, plate assembly in which the stresses resulting from rapid temperature excursions experienced in high temperature applications of the centrifugal fan can be survived with no ill effect to the fan.

Two patents relating to high temperature centrifugal fan hub assembly constructions are U.S. Pat. Nos. 3,602,609 and 3,832,091. In the first, the shaft is comprised of two stub shafts secured to the opposite sides of a centerplate (which is devoid of a center hole), with each stub shaft end adjacent to the centerplate being enlarged and hollowed to form enlarged diameter ring-shaped shaft end mounting flanges to provide a ring of thermal and mechanical contact at the centerplate, and with each side of the centerplate being provided with a countersunk ring surface in which the shaft flanges are seated, and with fastening bolts extending through the flanges and the thinner portion of the centerplate. In the latter patent, the centerplate has a central opening with a boss at its inner periphery received in annular recesses of the opposing hub members, and with the hub bolts being radially outwardly therefrom and extending through the hub members and the centerplate at a normal thickness location. While both of these superficially are pertinent to this patent application, it is believed that with the foregoing design considerations in mind and the description hereafter, the superficial pertinency will be found to be without substance.

SUMMARY OF THE INVENTION

In accordance with the invention, the assembly comprises a shaft, opposed hubs including a first hub inseparable from the shaft and preferably integral therewith and a second hub ring separable from the shaft, a disc-shaped fan plate having an inner peripheral margin disposed in sandwiched relation between the opposed faces of the hub and hub ring, the inner peripheral margin including a thickened ring portion providing oppositely projecting annular shoulders at the outer periphery of the thickened ring portion, both the hub and hub ring including annular recesses in their opposing faces to receive the thickened ring portion with the outer peripheries of the recesses being in closely abutting relation with the shoulders to provide a shoulder-recess bearing area, and a plurality of fastener means at circumferentially spaced locations around the hub and hub ring and extending in an axial direction through the hub, hub ring and thickened ring portion so that as a result the shoulder-recess bearing area is located radially outwardly from the bearing stress areas in the vicinity of the bolt holes. Also in accordance with the preferred form of the invention, the inner peripheral margin includes a radially outer portion comprising the thickened ring portion and a radially inner portion extending to the inner periphery of the plate and of reduced thickness relative to the thickness of the thickened ring portion with the second hub ring including a face area in closely facing relation to the opposing face area of the plate adjacent the inner periphery of the plate to resist the tendency of the plate to tilt in a direction away from the first hub near the shaft.

DRAWING DESCRIPTION

DESCRIPTION OF THE PREFERRED EMBODIMENT

Figure 1:
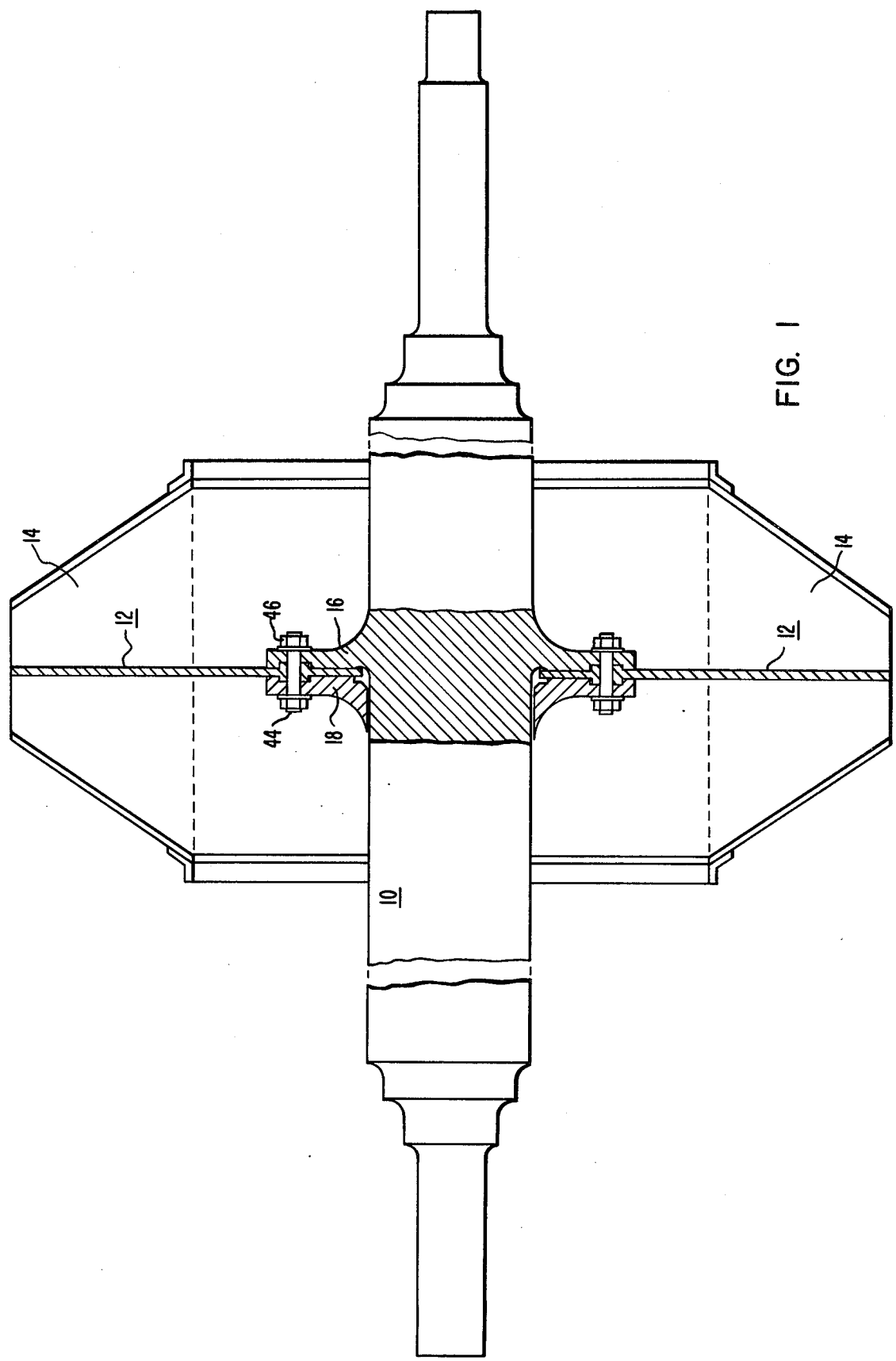
FIG. 1 is a side view of the arrangement according to the invention partly in section.
Figure 2:
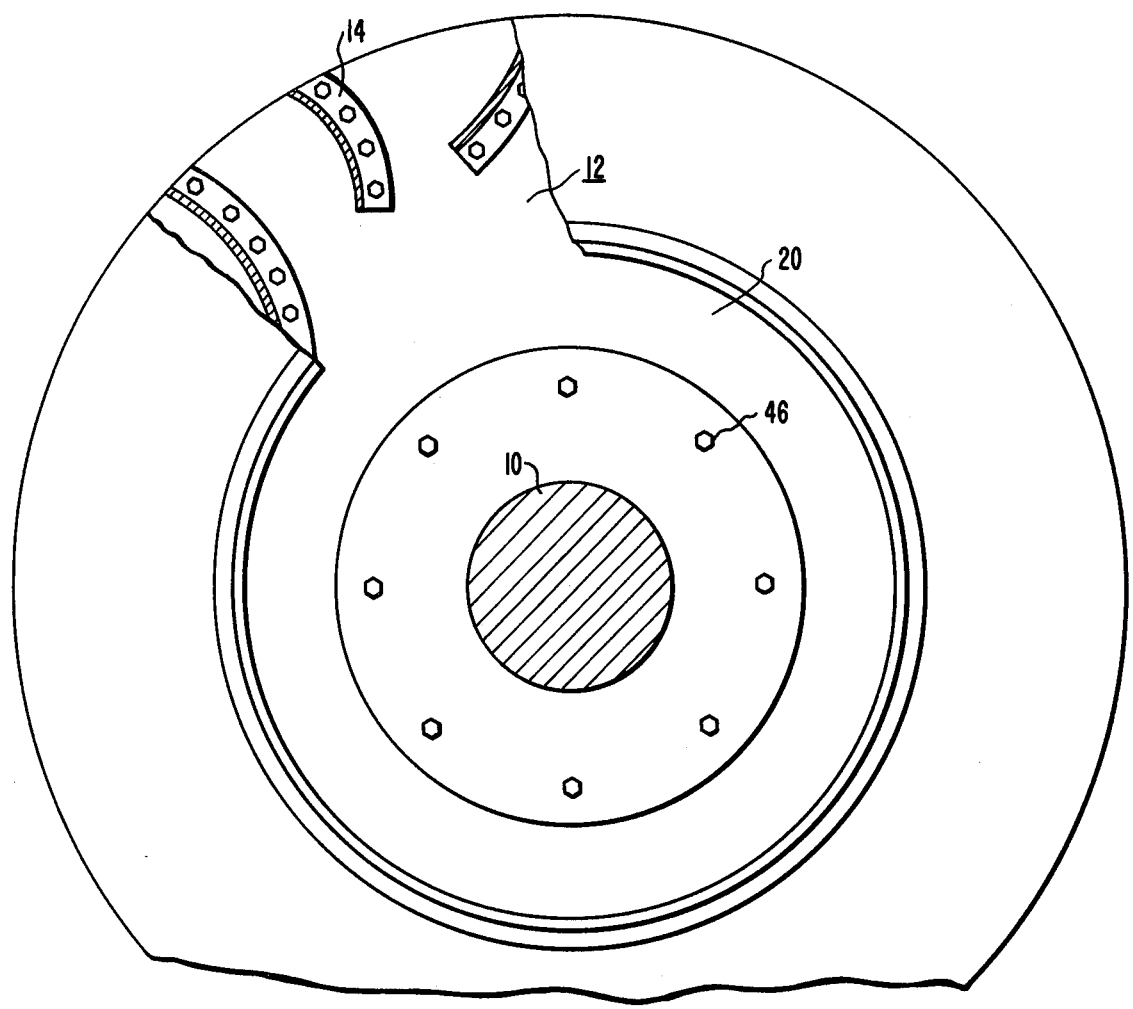
FIG. 2 is an end view as seen from the left of FIG. 1.

Referring to FIGS. 1 and 2, the centrifugal fan wheel includes shaft 10, the disc-shaped and apertured fan plate 12 having fan blades 14 mounted thereto at its outer peripheral portion, and a hub arrangement associated with the inner peripheral portion of the plate for securing the plate and wheel to the shaft. While the fan wheel illustrated in FIG. 1 is of the centerplate type, the invention is applicable to other types of fan wheels such as those in which the plate 12 is a back plate.

The hub assembly includes first hub member 16 which is inseparable from the shaft 10 and an opposing hub ring 18 which is separable from the shaft. In what is currently believed to be the preferred form of the invention, the shaft 10 and first hub member 16 are of one piece and this construction is termed herein an integral hub. However, the concept of the invention is also considered applicable to an assembly in which the first hub 16 is separate and heat shrunk onto the shaft and is thus inseparable as compared to the second hub member.

The fan plate 12 (FIG. 3) may be considered as comprising two concentric portions, the radially outer portion 20 which is radially beyond the hub assembly, and the inner peripheral portion or margin 22 which is sandwiched between the opposing faces of the first hub 16 and hub ring 18. This inner peripheral margin includes a thickened ring portion 24 which provides oppositely projecting annular shoulders 26 and 28 at the outer periphery of the thickened ring portion. To accommodate the thickened ring portion when the plate 12 and hub ring 18 are assembled to the shaft and integral hub 16, both the first hub and the hub ring include annular recesses 30 and 32 in their opposing faces to receive the thickened ring portion 24. The thickened ring portion is so located on the plate relative to the locations of the recesses in the hub and hub ring that the outer peripheries 34 and 36 of the annular recesses fit in closely abutting relation so that what herein are called shoulder-recess stress bearing areas are provided.

The thickened ring portion 24 may be provided in various ways depending upon manufacturing facilities and costs. For example, the thickened ring portion can be provided by machining a disc to reduce the thickness except in the thickened ring portion part, or it can be provided by welding eccentric ring portions of different thicknesses, along their peripheral edges and then machining, or two separate rings could be welded to the opposite sides of a flat disc.

Figure 3:
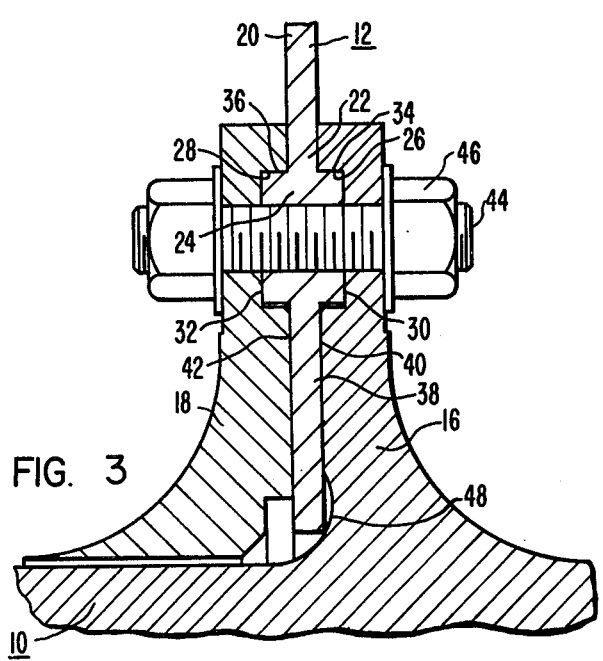
FIG. 3 is a fragmentary and enlarged sectional view of one form of the assembly.

As best seen in FIG. 3, the inner peripheral margin 22 of the plate is itself divided into a radially outer portion which includes the thickened ring portion 24, and a radially inner portion 38 which extends to the inner periphery of the plate and is of reduced thickness relative to the thickness of the thickened ring portion. In this case, the annular recesses 30 and 32 of the hub and hub ring have radial dimensions just sufficient to accommodate the thickened ring portions, with those portions of the hub and hub ring radially inwardly from the annular recesses having face areas 40 and 42, respectively, which are closely adjacent the oppositely facing faces of the inner peripheral portion 38 of the plate. While a slight clearance may be provided between the faces 40 and 42 relative to the opposing faces of the inner part 38 for purposes of assuring tight abutment of the thickened ring portion to the hub and hub ring, it is considered quite desirable that the face 42 of the separable hub ring 18 be closely adjacent to the opposing face of the inner periphery 38 of the plate. The reason for this is that during a start-up operation of the fan wheel in a hot environment, such as 750° F. (399° C.), the hub ring 18 can be expected to increase in temperature significantly faster than the increase in average temperature of the integral hub 16. This occurs of course because of the better heat transfer from the integral hub 16 to the shaft 10, which functions somewhat as a heat sink. As a result, the integral hub has higher stresses because the hub ring is free to expand radially while the integral hub 16 is restrained by its connection to the shaft 10. Since the hub ring 18 can expand to a greater degree than the integral hub 16, there is a tendency of the fan plate to tilt in a direction in which the inner peripheral portion 38 would move away from the face area 40 of the first hub. By providing the relatively close adjacency between the face area 42 of hub ring 18 and the opposing face of the inner periphery 38 of the plate, this tendency to tilt is restrained to a material degree.

The hub 16 (FIG. 3) and hub ring 18 hold the centerplate inner peripheral marginal portion 22 in its sandwiched relation by a plurality of fastener means at circumferentially spaced locations around the hub and hub ring, the fasteners illustrated being studs 44 which extend in an axial direction through the hub and hub ring, and through the thickened ring portion and are secured by nuts 46.

In the arrangement described and illustrated, it will be apparent that since the shoulder-recess bearing areas are located radially outwardly from the bearing stress areas of the plate and hubs in the area of the bolt holes, the stresses largely arising from the thermal transients in the fan in operation are applied for the most part to the shoulder-recess bearing areas.

While it has been determined that with a fan without the improvements disclosed herein that the region which experiences the highest stresses during large thermal transients is in the area of the hub and centerplate bolt circle region, the region next most critical with respect to thermal stress during heat up in a fan with an integral hub is at the inside corner area formed between the face area 40 of the integral hub 16 and the outer circumference of the shaft 10. To reduce the concentration of stress in that area, the face area 40 of the integral hub 16 is provided with a curved channel 48, as in the form of a rather large fillet, which encircles the shaft adjacent to the outer diameter shaft.

Figure 4:
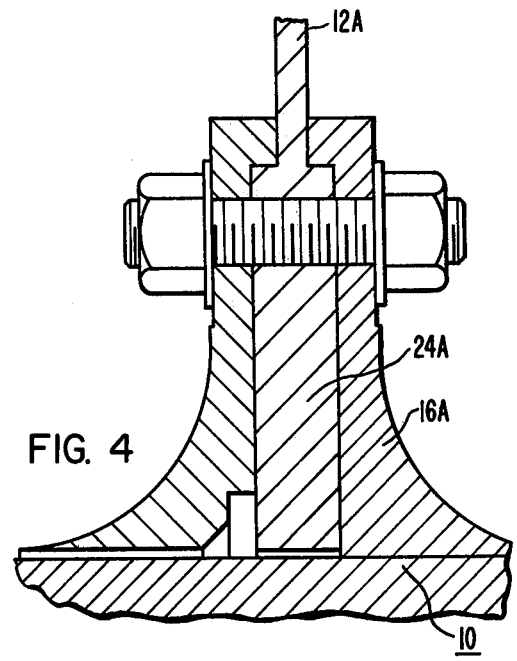
FIG. 4 is a similar view of another form.

An alternative embodiment is shown in FIG. 4 in which the hub 16a is heat shrunk onto the shaft 10 and the thickened portion 24a extends all the way radially inwardly to the inner periphery of the fan plate 12a and with the annular recesses of both of the opposing hubs extending all the way down to the inner periphery of the hubs. It will be noted of course that again the locational relationship of the shoulder-recess bearing stress areas to the stress areas around the bolt holes is the same as is shown in FIG. 1.

We claim:
1. A shaft, fan plate and hub assembly for a centrifugal fan, comprising:
   a shaft;
   a pair of opposed hubs including a first hub inseparable from said shaft and a second hub ring separable from said shaft;
   a disc-shaped fan plate having an inner peripheral margin disposed in sandwiched relation between the opposed faces of said hub and hub ring;
   said inner peripheral margin including a thickened ring portion providing oppositely projecting annular shoulders at the outer periphery of the thickened ring portion;
   both said hub and said hub ring including annular recesses in their opposing faces to receive said thickened ring portion with the outer peripheries of said recesses in closely abutting relation with said shoulders to provide a shoulder-recess bearing area;
   a plurality of fastener means at circumferentially spaced locations around said hub and hub ring and extending in an axial direction through said hub, hub ring and the thickened ring portion;

whereby the assembly arrangement results in said shoulder-recess bearing areas being located radially outwardly from the bearing stress areas in the vicinity of the fastener means so that the stress largely arising from thermal transients in the fan are applied for the most part to the shoulder-recess bearing areas.

2. An assembly according to claim 1 wherein:
said inner peripheral margin includes a radially outer portion comprising said thickened ring portion, and a radially inner portion extending to the inner periphery of said plate of reduced thickness relative to the thickness of said thickened ring portion.

3. An assembly according to claim 1 wherein:
said second hub ring includes a face area in closely facing relation to the opposing face area of said plate adjacent the inner periphery of said plate to resist the tendency of said plate to tilt in a direction away from said first hub near the shaft.

4. An assembly according to claim 1 wherein:
said shaft and said first hub comprise a one-piece member.

5. An assembly according to claim 1 wherein:
said first hub comprises a member initially separate from said shaft and heat shrunk fit onto said shaft.

6. An assembly according to claim 4 wherein:
the face of said first hub facing said plate is provided with a curved channel encircling the shaft and adjacent the outer diameter of the shaft, to provide stress relief at the interior corner formed by said first hub and shaft.

7. A fan plate and shaft assembly comprising:
a one-piece shaft;
a fan plate including a ring portion of increased thickness relative to the thickness of the remainder of said plate, said ring portion projecting out from both opposite faces of said plate at a location spaced radially outwardly from the periphery of the central aperture of the plate and having radially outer periphery faces generally normal to the opposite faces of the plate;
a first hub member inseparable from said shaft for rotation therewith and having an annular recess located on a face to register with and receive the projecting ring portions on one face of said plate;
a second hub member separable from said shaft and also having an annular recess to register with and receive the projecting ring portion on the opposite face of said plate;
fastener means extending axially, at circumferentially spaced locations around said hub means, through both of the hub members and through the thickened ring portions of said plate, with the outer peripheries of said ring portion in tightly abutting relation with the outer peripheries of said annular recesses;
said second hub member including a face area radially inwardly from said annular recess in closely facing relation to the opposing face of said plate to resist the tendency of the plate to tilt in a direction away from the first hub member.

8. An assembly according to claim 7 wherein:
said shaft and said first hub member comprise a one-piece element.

9. An assembly according to claim 7 wherein:
said first hub member comprises a part initially separate from said shaft and heat shrunk fit on to said shaft.

10. An assembly according to claim 8 wherein:
an annular stress relief channel is formed in the face of said hub member adjacent the outer diameter of said shaft in its face facing said plate.

* * * * *